US012609308B2

(12) United States Patent
Zhang et al.

(10) Patent No.: US 12,609,308 B2
(45) Date of Patent: Apr. 21, 2026

(54) LITHIUM-ION SECONDARY BATTERY, BATTERY MODULE, BATTERY PACK, AND ELECTRIC APPARATUS

(71) Applicant: CONTEMPORARY AMPEREX TECHNOLOGY (HONG KONG) LIMITED, Hong Kong (CN)

(72) Inventors: Cuiping Zhang, Ningde City (CN); Changlong Han, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 212 days.

(21) Appl. No.: 17/879,863

(22) Filed: Aug. 3, 2022

(65) Prior Publication Data

US 2023/0064435 A1 Mar. 2, 2023

Related U.S. Application Data

(63) Continuation of application No. PCT/CN2021/111788, filed on Aug. 10, 2021.

(51) Int. Cl.
*H01M 4/525* (2010.01)
*H01M 4/505* (2010.01)
(Continued)

(52) U.S. Cl.
CPC ........... *H01M 4/525* (2013.01); *H01M 4/505* (2013.01); *H01M 10/0525* (2013.01);
(Continued)

(58) Field of Classification Search
CPC ............ H01M 10/0567; H01M 10/0566–0569
See application file for complete search history.

(56) References Cited

U.S. PATENT DOCUMENTS

2019/0027779 A1* 1/2019 Sasagawa ......... H01M 10/0525
2020/0152964 A1* 5/2020 Li ......................... H01M 4/505
2022/0109146 A1* 4/2022 Nie ..................... H01M 4/1395

FOREIGN PATENT DOCUMENTS

CN 103762381 A1 4/2014
CN 105895953 A 8/2016
(Continued)

OTHER PUBLICATIONS

International Search Report of Application No. PCT/CN2021/111788 mailed Apr. 22, 2022.
(Continued)

*Primary Examiner* — Robert S Carrico
(74) *Attorney, Agent, or Firm* — K&L Gates LLP

(57) ABSTRACT

This application relates to a lithium-ion secondary battery. A positive electrode plate of the lithium-ion secondary battery includes a positive electrode active substance $LiNi_xCo_yN_zM_{1-x-y-z}O_2$, with N selected from Mn and Al, and M selected from any one of Co, Ni, Mn, Mg, Cu, Zn, Al, Sn, B, Ga, Cr, Sr, V, and Ti, where $0.5 \leq x < 1$, $0 \leq y \leq 1$, $0 \leq z \leq 1$, and $x+y+z \leq 1$; and an electrolyte of the lithium-ion secondary battery contains a specified amount of compounds represented by formula (1), formula (2), and formula (3). The lithium-ion secondary battery of this application has both high energy density and high thermal stability. This appli-
(Continued)

5 cation further relates to a battery module containing the lithium-ion secondary battery, a battery pack, and an electric apparatus.

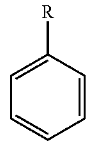

(1)

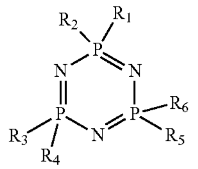

(2)

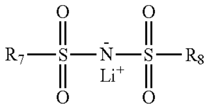

(3)

6 Claims, 4 Drawing Sheets

(51) Int. Cl.

| | |
|---|---|
| ***H01M 10/0525*** | (2010.01) |
| ***H01M 10/0567*** | (2010.01) |
| ***H01M 10/0568*** | (2010.01) |
| ***H01M 10/42*** | (2006.01) |

(52) U.S. Cl.

CPC ... *H01M 10/0567* (2013.01); *H01M 10/4235* (2013.01); *H01M 10/0568* (2013.01); *H01M 2300/0025* (2013.01)

(56) References Cited

FOREIGN PATENT DOCUMENTS

| | | | | | |
|---|---|---|---|---|---|
| CN | 107437634 | A | | 12/2017 | |
| CN | 109417199 | A | | 3/2019 | |
| CN | 106505194 | B | | 10/2020 | |
| CN | 110034327 | B | | 1/2021 | |
| CN | 114171794 | A | * | 3/2022 | |
| EP | 3651256 | A1 | | 5/2020 | |
| JP | 2015026590 | A | | 2/2015 | |
| JP | 2018026411 | A | | 2/2018 | |
| KR | 2014040285 | A1 | | 4/2014 | |
| KR | 1020140040285 | A | | 4/2014 | |
| KR | 20180013103 | A | | 2/2018 | |
| KR | 1020180013103 | A | | 2/2018 | |
| WO | WO-2018003993 | A1 | * | 1/2018 | ........ H01M 10/0525 |
| WO | 2021065863 | A1 | | 4/2021 | |

OTHER PUBLICATIONS

Written Opinion of Application No. PCT/CN2021/111788 mailed Apr. 22, 2022.

Decision to Grant a Patent dated Mar. 12, 2024 for Application No. JP 2022-548240.

Extended European Search Report for Application No. PCT/CN2021/111788, dated Sep. 21, 2023, 8 pages.

Japan Office Action for Application No. 2022-548240, dated Oct. 3, 2023, 2 pages.

Korean Office Action for Application No. KR2014040285A1, mailed on Sep. 4, 2024, 8 pages.

Korea Office Action for Korean Application 10-2022-7027803, mailed on Mar. 11, 2025, 4 pages.

* cited by examiner

LITHIUM-ION SECONDARY BATTERY, BATTERY MODULE, BATTERY PACK, AND ELECTRIC APPARATUS

CROSS-REFERENCE TO RELATED APPLICATIONS

This application is a continuation of International application PCT/CN2021/111788 filed on Aug. 10, 2021, the disclosure of which is hereby incorporated by reference in its entirety.

TECHNICAL FIELD

This application relates to the field of lithium-ion secondary batteries, and in particular, to a lithium-ion secondary battery having high energy density and high thermal stability, a battery module, a battery pack, and an electric apparatus.

BACKGROUND

With depletion of fossil energy and growing concern about environmental pollution, new energy sources gradually emerge and thrive. Featured by low costs, long service life, high safety, and the like, lithium-ion secondary batteries have become the most popular energy storage system, and are currently widely used in battery electric vehicles, hybrid electric vehicles, smart power grids, and other fields.

In view of actual operating conditions of cells, it has been a constant requirement to increase energy density of the cells. A high-nickel ternary positive electrode material is undoubtedly the most direct way to increase the energy density. However, an increase in an amount of nickel in a positive electrode active substance causes thermal stability of the positive electrode active substance to drop, making it easy to produce reactive oxygen, triggering oxygenation of an electrolyte, and producing more heat. Especially when an external temperature is high (extreme weather in South China or Africa), heat cannot be dissipated in time, leading to a sharp rise in a temperature of a cell, which further triggers decomposition of the electrolyte. Such vicious cycle eventually leads to thermal runaway of the cell, to be specific, the sharp rise in the temperature of the cell, causing smoke, fire, or severe safety accidents.

Therefore, it is required to increase energy density of lithium-ion secondary batteries while ensuring thermal stability of the batteries.

SUMMARY

This application has been made in view of the foregoing issues. An objective of this application is to provide a lithium-ion secondary battery, to resolve a problem of poor thermal stability of high-energy-density cells by using a high-nickel ternary positive electrode material.

To achieve the foregoing objective, a first aspect of this application provides a lithium-ion secondary battery including a positive electrode plate, a negative electrode plate, a separator, and an electrolyte, where the positive electrode plate includes a positive electrode current collector and a positive electrode material layer disposed on at least one surface of the positive electrode current collector, and the positive electrode material layer contains a positive electrode active substance, where the positive electrode active substance includes $LiNi_xCo_yN_zM_{1-x-y-z}O_2$, with N selected from Mn and Al, and M selected from any one of Co, Ni, Mn, Mg, Cu, Zn, Al, Sn, B, Ga, Cr, Sr, V, and Ti, where $0.5 \le x < 1$, $0 \le y \le 1$, $0 \le z \le 1$, and $x+y+z \le 1$; and the electrolyte includes compounds represented by formula (1), formula (2), and formula (3):

(1)

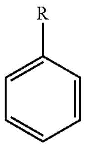

, where R is selected from a fluorine atom and a fluorinated C1-C6 alkyl group, and optionally is a fluorinated C1-C6 alkyl group, (2)

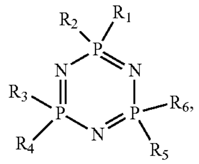

where $R_1$ to $R_6$ are each independently selected from a C1-C6 halogenated alkyl group, halogen, a C1-C6 alkyl group, a C1-C6 alkoxy group, and a C1-C6 alkyl group containing N or P, where the halogen is fluorine, chlorine, bromine, or iodine, and a ratio of the number of halogen atoms to the number of P atoms in the compound represented by formula (2) is 1:3 to 2:1, and optionally 5:3, (3)

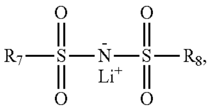

where $R_7$ and $R_8$ are each independently selected from a C1-C3 alkyl group substituted by a fluorine atom, a hydrogen atom, a fluorine atom, and a helium atom, and based on a total weight of the electrolyte, a percentage by weight of the compound represented by formula (1) is W1%, a percentage by weight of the compound represented by formula (2) is W2%, and a percentage by weight of the compound represented by formula (3) is W3%, where W1, W2, and W3 satisfy $1 \le W3/W2 \le 4$ and $0.5 \le W1/W2 \le 1$.

The electrolyte containing a specified amount of the compounds represented by formula (1), formula (2), and formula (3) is used in the lithium-ion secondary battery containing the high-nickel positive electrode active substance, so that the battery can have excellent high-temperature storage performance, a high thermal runaway temperature, and excellent low-temperature discharge power performance while obtaining high cell energy density.

In any embodiment, W1% is in a range of 1%-15%, and optionally 3%-10%. In this way, conductivity of the electrolyte can be further improved, and an electrode plate material can be better infiltrated.

In any embodiment, W2% is in a range of 1%-20%, and optionally 5%-15%. In this way, safety performance of the battery can be improved, with conductivity of the electrolyte guaranteed as well.

In any embodiment, W3% is in a range of 5%-20%, and optionally 5%-16%. In this way, thermal stability of the electrolyte can be better improved while avoiding corrosion of an aluminum foil.

In any embodiment, $R_1$ to $R_6$ in formula (2) are each independently selected from halogen and a C1-C6 alkoxy group; and optionally $R_1$ to $R_5$ are all fluorine atoms and $R_6$ is a C1-C6 alkoxy group. A further selection of a substituent group can further improve safety performance of the cell.

In any embodiment, the compound represented by formula (3) is lithium bis(fluorosulfonyl)imide. A selection of the lithium bis(fluorosulfonyl)imide helps improve energy density of the cell and increase conductivity of the electrolyte.

In any embodiment, the lithium-ion secondary battery satisfies at least one of the following conditions (a) and (b):

$$W3 = 25x^2;\text{ and} \quad (a)$$

$$W2 = 10x. \quad (b)$$

When at least one of conditions (a) and (b) is satisfied, thermal stability and flame retardancy of the electrolyte can be improved, thereby significantly improving safety performance of the cell.

In any embodiment, 0.65≤x≤0.9, and optionally x=0.8. A selection of a value of x helps obtain a battery with stability and high energy density.

In any embodiment, a total concentration of lithium salts in the electrolyte is 0.8M-1.5M, and optionally 0.8M-1.2M. A selection of the total concentration of the lithium salts helps improve power performance and safety of the cell.

In any embodiment, the negative electrode plate includes a negative electrode current collector and a negative electrode material layer disposed on at least one surface of the negative electrode current collector, the negative electrode material layer contains a negative electrode active substance, and the negative electrode active substance contains graphite with OI≥8 whose percentage by weight is ≤20% based on a total weight of the negative electrode active substance; and optionally, the percentage by weight of the graphite with OI≥8 is 10%-20% based on the total weight of the negative electrode active substance. A combination of the specified amount of highly expanded graphite with OI≥8, the electrolyte, and the positive electrode active substance can significantly improve cycling performance, storage performance, and rate performance of the cell.

A second aspect of this application provides a battery module, including the lithium-ion secondary battery in the first aspect of this application.

A third aspect of this application provides a battery pack, including the battery module in the second aspect of this application.

A fourth aspect of this application provides an electric apparatus, including more than one of the lithium-ion secondary battery in the first aspect of this application, the battery module in the second aspect of this application, or the battery pack in the third aspect of this application.

BRIEF DESCRIPTION OF DRAWINGS

To describe the technical solutions in the embodiments of this application more clearly, the following briefly describes the accompanying drawings required for describing embodiments of this application. Apparently, the accompanying drawings in the following description show only some embodiments of this application, and a person of ordinary skill in the art may still derive other drawings from these accompanying drawings without creative efforts.

Figure 1:
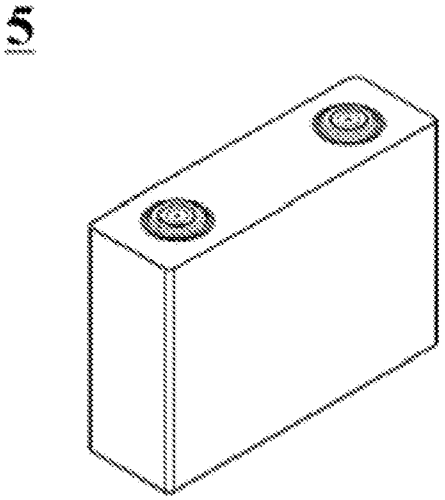
FIG. 1 is a schematic diagram of a lithium-ion secondary battery according to an embodiment of this application.

Reference signs are described as follows:

1. battery pack
2. upper box body
3. lower box body
4. battery module
5. lithium-ion secondary battery
51. housing
52. electrode assembly
53. cover plate

DESCRIPTION OF EMBODIMENTS

For brevity, this application specifically discloses some numerical ranges. However, any lower limit may be combined with any upper limit to form an unspecified range, and any lower limit may be combined with another lower limit to form an unspecified range, and likewise, any upper limit may be combined with any other upper limit to form an unspecified range. In addition, each individually disclosed point or single numerical value, as a lower limit or an upper limit, may be combined with any other point or single numerical value or combined with another lower limit or upper limit to form an unspecified range.

The most common method used to increase energy density of cells of lithium-ion secondary batteries is to increase an amount of nickel in a positive electrode material. However, a large amount of LiOH and $Li_2CO_3$ is usually present on a surface of a high-nickel ternary positive electrode active substance, and these substances are alkaline to some degree. A conventional electrolyte using a $LiPF_6$-carbonate solvent system decomposes at a high temperature, producing HF. The HF produced reacts with LiOH and $Li_2CO_3$, destroying a positive electrode interface. As a result, the electrolyte is constantly oxidized at the positive electrode interface, and active lithium is consumed, leading to a drop in cycling performance. Especially in a full charge state, this side reaction of oxidation is further intensified due to a high potential of a positive electrode. In addition, a decomposition product of the electrolyte deposits at cathode and anode interfaces, blocking migration of lithium ions, increasing a DCR, and reducing low-temperature discharge power. In addition, according to the Joule's law, much heat is produced in a battery charging and discharging process, which may ultimately pose safety problems. Through a lot of researches, the inventors have found that using a specified electrolyte in the lithium-ion secondary battery in the first aspect of this application can greatly improve safety performance of the cell in a high-nickel ternary system.

Lithium-Ion Secondary Battery

Generally, a lithium-ion secondary battery includes a positive electrode plate, a negative electrode plate, a separator, and an electrolyte. In a battery charging and discharging process, active ions are intercalated and deintercalated between the positive electrode plate and the negative electrode plate. The separator is disposed between the positive electrode plate and the negative electrode plate to provide separation. The electrolyte is disposed between the positive electrode plate and the negative electrode plate to conduct ions.

A lithium-ion secondary battery in a first aspect of this application includes a positive electrode plate, a negative electrode plate, a separator, and an electrolyte, where the positive electrode plate includes a positive electrode current collector and a positive electrode material layer disposed on at least one surface of the positive electrode current collector, and the positive electrode material layer contains a positive electrode active substance, where the positive electrode active substance includes $LiNi_xCo_yN_zM_{1-x-y-z}O_2$, with N selected from Mn and Al, and M selected from any one of Co, Ni, Mn, Mg, Cu, Zn, Al, Sn, B, Ga, Cr, Sr, V, and Ti, where $0.5 \le x < 1$, $0 \le y \le 1$, $0 \le z \le 1$, and $x+y+z \le 1$; and the electrolyte includes compounds represented by formula (1), formula (2), and formula (3):

(1)

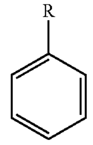

, where R is selected from a fluorine atom and a fluorinated C1-C6 alkyl group, and optionally is a fluorinated C1-C6 alkyl group, (2)

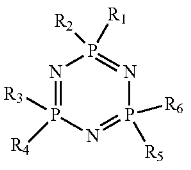

, where $R_1$ to $R_6$ are each independently selected from a C1-C6 halogenated alkyl group, halogen, a C1-C6 alkyl group, a C1-C6 alkoxy group, and a C1-C6 alkyl group containing N or P, where the halogen is fluorine, chlorine, bromine, or iodine, and a ratio of the number of halogen atoms to the number of P atoms in the compound represented by formula (2) is 1:3 to 2:1, and optionally 5:3, (3)

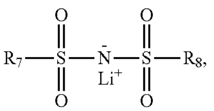

where $R_7$ and $R_8$ are each independently selected from a C1-C3 alkyl group substituted by a fluorine atom, a hydrogen atom, a fluorine atom, and a helium atom, and based on a total weight of the electrolyte, a percentage by weight of the compound represented by formula (1) is W1%, a percentage by weight of the compound represented by formula (2) is W2%, and a percentage by weight of the compound represented by formula (3) is W3%, where W1, W2, and W3 satisfy $1 \le W3/W2 \le 4$ and $0.5 \le W1/W2 \le 1$.

Specifically, the electrolyte containing a specified amount of the compounds represented by formula (1), formula (2), and formula (3) is used in the lithium-ion secondary battery containing the high-nickel positive electrode active substance, so that the battery can have excellent high-temperature storage performance, a high thermal runaway temperature, and excellent low-temperature discharge power performance while obtaining high cell energy density. When a value of W3/W2 is less than 1, not only viscosity of the electrolyte increases significantly, but also an amount of a dissociable lithium salt in the electrolyte is low. As a result, conductivity of the electrolyte decreases significantly, heavily affecting service life, rate performance, power, and other performance of the cell. When the value of W3/W2 is greater than 4, it is difficult to inhibit corrosion of an aluminum foil by the compound represented by formula (3). When a value of W1/W2 is less than 0.5, viscosity of the electrolyte decreases, and further, conductivity of the electrolyte decreases. When the value of W1/W2 is greater than 1, phosphonitrile in the electrolyte is too little to improve safety performance of the battery.

By selecting the ratio of the number of halogen atoms to the number of P atoms in the compound represented by formula (2), it can be ensured that the compound decomposes and absorbs heat at a thermal runaway temperature of the cell (the temperature is ≥100° C.), produces phosphate that deposits on surfaces of the electrode plates, prevents the electrolyte from coming into contact with the electrode plates, and relieves the thermal runaway, and sufficient halogen free radicals are produced to effectively trap hydrogen free radicals and oxygen free radicals, thereby significantly improving safety performance of the cell. When the ratio of the number of halogen atoms to the number of P atoms is less than 1:3, although the compound decomposes and produces solid phosphate, it is difficult to eliminate hydrogen free radicals and oxygen free radicals produced by decomposition of the electrolyte. Therefore, a chain reaction of thermal decomposition of the electrolyte is not terminated, and it is difficult to significantly improve safety of the cell. When the ratio of the number of halogen atoms to the number of P atoms is greater than 2:1, phosphate produced by the composition of the compound is too little to fully cover a positive electrode interface and a negative electrode interface, and therefore cannot prevent a side reaction of the electrolyte at the positive electrode interface and the negative electrode interface.

In some embodiments, W1% is in a range of 1%-15%, and optionally 3%-10%. A selection of the percentage by weight of the compound represented by formula (1) can further improve conductivity of the electrolyte, and an electrode plate material can be better infiltrated.

In some embodiments, W2% is in a range of 1%-20%, and optionally 5%-15%. A selection of the percentage by weight of the compound represented by formula (2) can improve safety performance of the battery, with conductivity of the electrolyte guaranteed as well.

In some embodiments, W3% is in a range of 5%-20%, and optionally 5%-16%. A selection of the percentage by weight of the compound represented by formula (3) can better improve thermal stability of the electrolyte, while avoiding corrosion of an aluminum foil.

In some embodiments, $R_1$ to $R_6$ in formula (2) are each independently selected from halogen and a C1-C6 alkoxy group; and optionally $R_1$ to $R_5$ are all fluorine atoms and $R_6$ is a C1-C6 alkoxy group. Phosphonitrile represented by formula (2) may decompose at a high temperature, and phosphorus-containing and fluorine-containing free radical groups produced therefrom can trap hydroxide radicals produced by decomposition of a solvent in the electrolyte, which terminates a chain reaction of the solvent, improving safety performance. A further selection of a substituent group of a phosphonitrile structure can further improve safety performance of the cell.

In some embodiments, the compound represented by formula (3) is lithium bis(fluorosulfonyl)imide. Compared with other fluorosulfonimide lithium salts, bis(fluorosulfonyl)imide has a minimum molecular weight, with a minimum mass in a case of an equal quantity, which reduces a mass of the cell and increases energy density of the cell to some degrees. In addition, bis(fluorosulfonyl)imide is easier to dissociate lithium ions, thereby helping increase conductivity of the electrolyte.

In some embodiments, the lithium-ion secondary battery satisfies at least one of the following conditions (a) and (b):

$$W3 = 25x^2\text{; and} \quad (a)$$

$$W2 = 10x. \quad (b)$$

As an amount of nickel in the positive electrode active substance increases, in other words, as x increases, energy density of the cell increases. However, a thermal decomposition temperature of the positive electrode active substance decreases, more heat is released, and thermal stability of the material deteriorates. When the amount x of nickel and an amount of phosphonitrile and lithium imide in the electrolyte satisfy at least one of the conditions (a) and (b), thermal stability and flame retardancy of the electrolyte can be further improved, thereby significantly improving safety performance of the cell.

In some embodiments, $0.65 \le x \le 0.9$, and optionally x=0.8. When x is greater than 0.9, a structure of the positive electrode tends to be unstable, leading to serious oxidation of the electrolyte in a full charge state of the battery. When x is less than 0.65, the positive electrode is stable. However, a gram capacity of the material is too low to meet a requirement of high energy density for the battery.

In some embodiments, a total concentration of lithium salts in the electrolyte is 0.8M-1.5M, and optionally 0.8M-1.2M. The inventors find that affected by the concentration of the lithium salts, conductivity of the electrolyte presents a parabolic pattern. If the concentration of the lithium salts is excessively high, viscosity of the electrolyte may increase sharply and the number of lithium ions dissociated increases slowly. Therefore, the conductivity of the electrolyte also decreases, which deteriorates power performance of the cell. In addition, the concentration of the lithium salts in the electrolyte further directly affects safety performance of the cell. When the concentration of the lithium salts in the electrolyte is excessively low, there is severe anode polarization at an end stage of charging, precipitation of lithium dendrites is easy to occur at an anode interface. The dendrites penetrate the separator, bringing about a risk of short circuit.

In some embodiments, the negative electrode plate includes a negative electrode current collector and a negative electrode material layer disposed on at least one surface of the negative electrode current collector, the negative electrode material layer contains a negative electrode active substance, and the negative electrode active substance contains graphite with OI≥8 whose percentage by weight is ≤20% based on a total weight of the negative electrode active substance; and optionally, the percentage by weight of the graphite with OI≥8 is 10%-20% based on the total weight of the negative electrode active substance.

A value of the OI has a meaning commonly understood in the art, referring to a degree of orientation. In a cell with high energy density, high-capacity graphite, for example, graphite with OI≥8, is usually used to match a high-nickel ternary positive electrode material to achieve high energy density. However, as for such graphite, lithium ions are easy to intercalate into the graphite during charging, resulting in expansion of a graphite electrode plate to some degrees. In other words, the high-capacity graphite usually has a high degree of expansion. The highly expanded graphite expands during a life cycle thereof and extrudes the electrolyte, leading to lithium precipitation at an anode, an increase in a thickness of the electrode plate, and deterioration of performance of the cell. A combination of the highly expanded graphite with OI≥8 whose percentage by weight is ≤20%, the electrolyte, and the positive electrode active substance can improve cycling performance, storage performance, and rate performance of the cell significantly.

The following describes a positive electrode plate, a negative electrode plate, a separator, and an electrolyte of a battery separately.

[Electrolyte]

The electrolyte is disposed between the positive electrode plate and the negative electrode plate to conduct ions. The electrolyte includes an electrolytic salt and a solvent.

In this application, the electrolytic salt may be a common electrolytic salt in a lithium-ion secondary battery, for example, a lithium salt, including the lithium salt represented by the foregoing formula (3). In an example, the electrolytic salt may be selected from more than one of $LiPF_6$ (lithium hexafluorophosphate), $LiBF_4$ (lithium tetrafluoroborate), $LiAsF_6$ (lithium hexafluoroarsenate), LiFSI (lithium bis(fluorosulfonyl)imide), LiTFSI (lithium bis-trifluoromethanesulfonimide), LiTFS (lithium trifluoromethanesulfonat), LiDFOB (lithium difluorooxalatoborate), $LiPO_2F_2$ (lithium difluorophosphate), LiDFOP (lithium bis (oxyalyl)difluorophosphate), $LiSO_3F$ (lithium fluorosulfonate), difluorodioxalate $Li_2F(SO_2N)_2SO_2F$, KFSI, CsFSI, $Ba(FSI)_2$, and $LiFSO_2NSO_2CH_2CH_2CF_3$. In some embodiments, the electrolytic salt includes $LiPF_6$.

The solvent is not particularly limited in type, and may be selected based on actual needs. In some embodiments, the solvent is a non-aqueous solvent. Optionally, the solvent may include one or more of linear carbonate, cyclic carbonate, and carboxylate. In some embodiments, the solvent may be further selected from more than one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetrahydrofuran, tetramethylene sulfone (SF), methyl sulfone (MSM), ethyl methyl sulfone (EMS), and diethyl sulfone (ESE). From a perspective of having excellent thermal stability and electrochemical stability at a high temperature and a high voltage, optionally, in addition to dimethyl carbonate, the solvent may be selected from one or more of diethyl carbonate, dipropyl carbonate, ethyl methyl carbonate, methyl propyl carbonate, ethylene carbonate, propylene carbonate, butenyl carbonate, ethyl propyl carbonate, 1,4-butyrolactone, methyl formate, ethyl acetate, propyl acetate, methyl propionate, ethyl propionate, methyl propionate, and tetrahydrofuran, thereby providing a stable electrochemical environment for high-nickel lithium-ion batteries with a voltage of 4 V and above. Optionally, a mass percentage of the non-aqueous solvent in the electrolyte is 65%-85%.

In some embodiments, the electrolyte further optionally includes other additives. For example, the additives may include a negative electrode film-forming additive, or may include a positive electrode film-forming additive, or may include an additive that can improve some performance of a battery, for example, an additive for improving over-charge performance of the battery, an additive for improving high-temperature performance of the battery, and an additive for improving low-temperature performance of the battery. In an example, the additives are selected from at least one of cyclic carbonate compound containing unsaturated bonds, cyclic carbonate compound substituted by halogen, sulfate compound, sulfite compound, sultone compound, disulfonic compound, nitrile compound, aromatic compound, isocyanate compound, phosphonitrile compound, cyclic anhydride compound, phosphite ester compound, phosphate ester compound, borate compound, and carboxylic ester compound.

[Positive Electrode Plate]

The positive electrode plate includes a positive electrode current collector and a positive electrode material layer disposed on at least one surface of the positive electrode current collector, and the positive electrode material layer includes a positive electrode active substance and carbon.

In an example, the positive electrode current collector has two opposite surfaces in a thickness direction thereof, and the positive electrode material layer is disposed on either or both of the two opposite surfaces of the positive electrode current collector.

In the lithium-ion secondary battery in this application, the positive electrode current collector may be a metal foil or a composite current collector. For example, for the metal foil, an aluminum foil may be used. The composite current collector may include a polymer material matrix and a metal layer formed on at least one surface of the polymer material matrix. The composite current collector may be formed by forming a metal material (for example, aluminum, aluminum alloy, nickel, nickel alloy, titanium, titanium alloy, silver, silver alloy, or the like) on the polymer material matrix (for example, matrices of polypropylene (PP), polyethylene terephthalate (PET), polybutylene terephthalate (PBT), polystyrene (PS), and polyethylene (PE)).

In some embodiments, in addition to the $LiNi_xCo_yN_zM_{1-x-y-z}O_2$, the positive electrode active substance may further include one or more of lithium transition metal oxide, olivine-structured lithium-containing phosphate, and modified compounds thereof. Optionally, a percentage by weight of the $LiNi_xCo_yN_zM_{1-x-y-z}O_2$ in a total weight of the positive electrode active substance is 60%-100%, and optionally 80%-100%. Examples of the lithium transition metal oxide may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide $LiNi_aCo_bMn_cO_2$ ($a+b+c=1$, $a<0.8$), lithium nickel cobalt aluminum oxide, and modified compounds thereof. Examples of the olivine-structured lithium-containing phosphate may include, but are not limited to, one or more of lithium iron phosphate, composite materials of lithium iron phosphate and carbon, lithium manganese phosphate, composite materials of lithium manganese phosphate and carbon, lithium manganese iron phosphate, composite materials of lithium manganese iron phosphate and carbon, and modified compounds thereof. These materials are all commercially available. A surface of the positive electrode active substance may be coated with carbon.

The positive electrode material layer optionally includes a conductive agent. The conductive agent is not limited to a specific type, and may be selected by persons skilled in the art based on actual needs. In an example, the conductive agent used in the positive electrode material layer may be selected from more than one of Super P, superconducting carbon, acetylene black, carbon black, Ketjen black, carbon dots, carbon nanotubes, graphene, and carbon nanofiber.

The positive electrode material layer further optionally includes a binder.

In an example, the binder may be one or more of styrene-butadiene rubber (SBR), water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

The positive electrode plate in this application may be prepared by using the method known in the art. In an example, the positive electrode active substance, the conductive agent, and the binder may be dispersed in a solvent (for example, N-methylpyrrolidone (NMP)) to form a uniform positive electrode slurry, and the positive electrode slurry is applied on a positive electrode current collector, and processes such as drying and cold pressing are performed to obtain the positive electrode plate.

[Negative Electrode Plate]

The negative electrode plate includes a negative electrode current collector and a negative electrode material layer disposed on at least one surface of the negative electrode current collector, and the negative electrode material layer includes a negative electrode active substance.

In an example, the negative electrode current collector has two opposite surfaces in a thickness direction thereof, and the negative electrode material layer is disposed on either or both of the two opposite surfaces of the negative electrode current collector.

In the lithium-ion secondary battery in this application, the negative electrode current collector may be a metal foil or a composite current collector. For example, for the metal foil, a copper foil may be used. The composite current collector may include a polymer material matrix and a metal layer formed on at least one surface of the polymer material matrix. The composite current collector may be formed by forming a metal material (for example, copper, copper alloy, nickel, nickel alloy, titanium, titanium alloy, silver, silver alloy, or the like) on the polymer material matrix (for example, matrices of polypropylene (PP), polyethylene terephthalate (PET), polybutylene terephthalate (PBT), polystyrene (PS), and polyethylene (PE)).

In the secondary battery of this application, the negative electrode material layer usually includes a negative electrode active substance, an optional binder, an optional conductive agent, and other optional additives, and is usually formed by being coated with a negative electrode slurry and dried. The negative electrode slurry is usually obtained by dispersing the negative electrode active substance and the optional conductive agent, the optional binder, and the like in a solvent and stirring them to a uniform mixture. The solvent may be N-methylpyrrolidone (NMP) or deionized water.

A specific type of the negative electrode active substance is not limited. An active substance known in the art that can be used as the negative electrode of the lithium-ion secondary battery may be used, and persons skilled in the art may select an active substance based on actual needs. In an example, the negative electrode active substance may be selected from one or more of natural graphite, artificial graphite, mesocarbon microbeads (MCMB for short), hard carbon, soft carbon, silicon, a silicon-carbon composite, a Li—Sn alloy, a Li—Sn—O alloy, Sn, SnO, $SnO_2$, spinel-structure lithiated $TiO_2$—$Li_4Ti_5O_{12}$, and a Li—Al alloy.

In an example, the conductive agent may be selected from more than one of Super P, superconducting carbon, acetylene black, carbon black, Ketjen black, carbon dots, carbon nanotubes, graphene, and carbon nanofiber.

In an example, the binder may be selected from more than one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

The other optional additives are, for example, a thickener (for example, sodium carboxymethyl cellulose (CMC-Na)).

[Separator]

Lithium-ion secondary batteries using an electrolyte further include a separator. The separator is disposed between the positive electrode plate and the negative electrode plate to provide separation. The separator is not limited to any specific type in this application, and may be any commonly known porous separator with good chemical stability and mechanical stability. In some embodiments, a material of the separator may be selected from more than one of glass fiber, non-woven fabric, polyethylene, polypropylene, and polyvinylidene fluoride. The separator may be a single-layer film or a multi-layer composite film, and is not specifically limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the lithium-ion secondary battery may include an outer package. The outer package may be used for packaging the electrode assembly and the electrolyte.

In some embodiments, an outer package of the lithium-ion secondary battery may be a hard shell, for example, a hard plastic shell, an aluminum shell, or a steel shell. The outer package of the lithium-ion secondary battery may alternatively be a soft pack, for example, a soft pouch. A material of the soft pack may be plastic. As the plastic, polypropylene (PP), polybutylene terephthalate (PBT), and polybutylene succinate (PBS) may be listed.

This application has no particular limitation on a shape of the lithium-ion secondary battery, and the lithium-ion secondary battery may be of a cylindrical, square, or any other shape. For example, FIG. 1 shows a lithium-ion secondary battery 5 of a square structure as an example.

Figure 2:
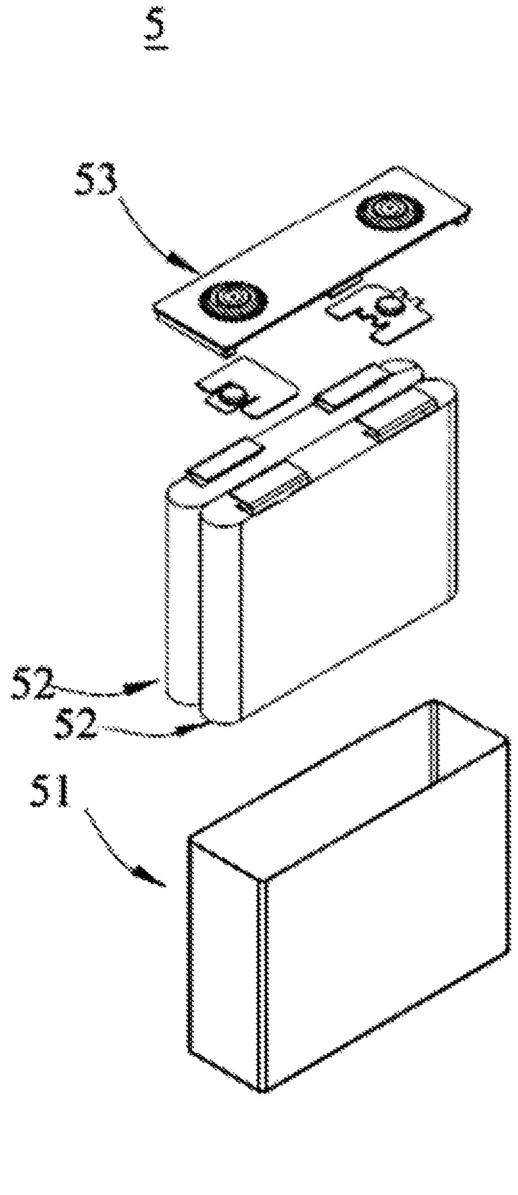
FIG. 2 is an exploded view of the lithium-ion secondary battery according to the embodiment of this application in FIG. 1.

In some embodiments, referring to FIG. 2, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the lithium-ion secondary battery 5, and persons skilled in the art may make choices based on actual needs.

In some embodiments, lithium-ion secondary batteries may be assembled into a battery module, and the battery module may include one or more lithium-ion secondary batteries. A specific quantity may be chosen by persons skilled in the art based on use and capacity of the battery module.

Figure 3:
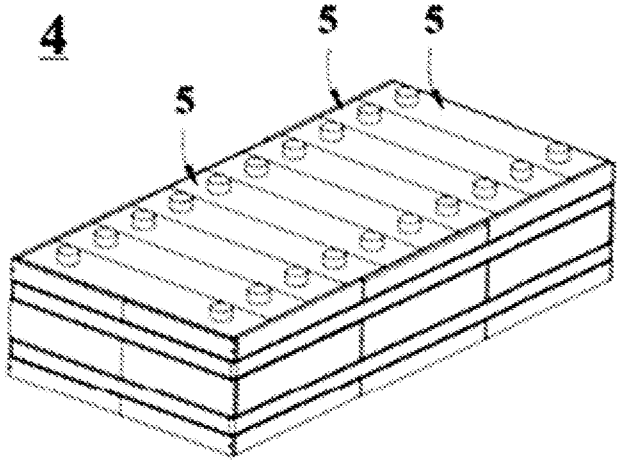
FIG. 3 is a schematic diagram of a battery module according to an embodiment of this application.

FIG. 3 shows a battery module 4 as an example. Referring to FIG. 3, in the battery module 4, a plurality of lithium-ion secondary batteries 5 may be sequentially arranged in a length direction of the battery module 4. Certainly, the plurality of lithium-ion secondary batteries may alternatively be arranged in any other manner. Further, the plurality of lithium-ion secondary batteries 5 may be fixed by using fasteners.

Optionally, the battery module 4 may further include a housing with an accommodating space, and the plurality of lithium-ion secondary batteries 5 are accommodated in the accommodating space.

In some embodiments, the battery module may be further assembled into a battery pack, and a quantity of battery modules included in the battery pack may be chosen by persons skilled in the art based on use and capacity of the battery pack.

Figure 4:
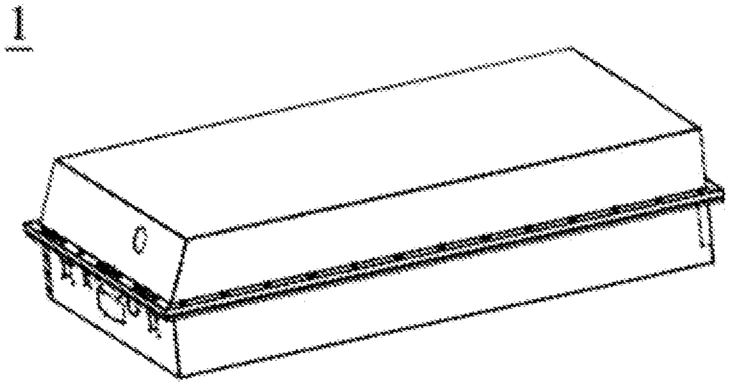
FIG. 4 is a schematic diagram of a battery pack according to an embodiment of this application.
Figure 5:
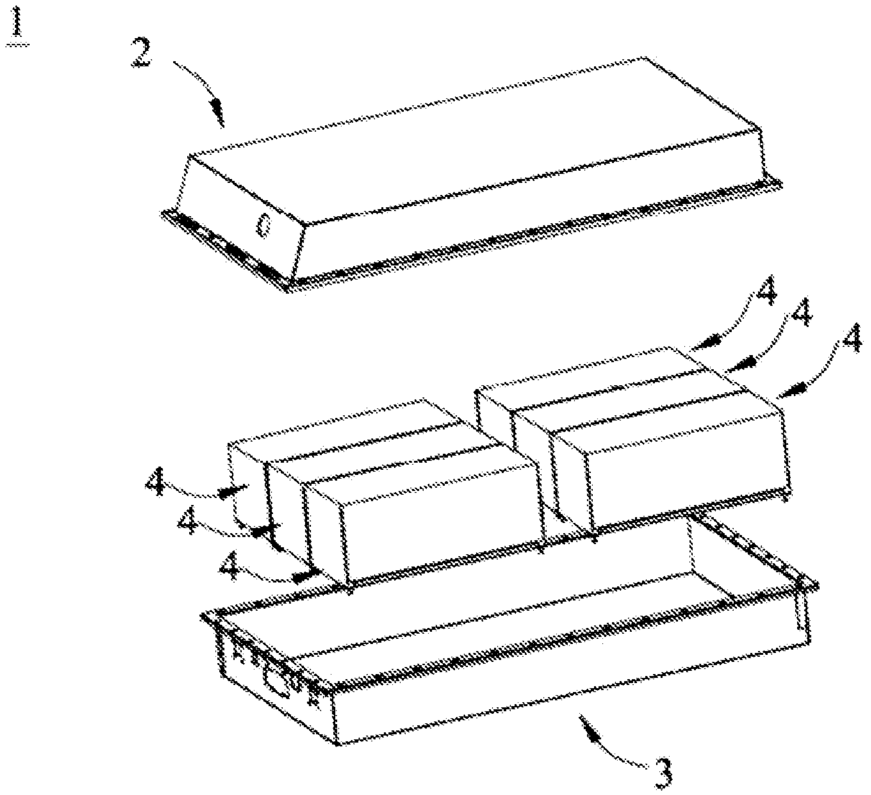
FIG. 5 is an exploded view of the battery pack according to the embodiment of this application in FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an apparatus. The apparatus includes more than one of the lithium-ion secondary battery, the battery module, or the battery pack provided in this application. The lithium-ion secondary battery, the battery module, or the battery pack may be used as a power source of the apparatus or an energy storage unit of the apparatus. The apparatus may be, but is not limited to, a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium-ion secondary battery, a battery module, or a battery pack may be selected for the apparatus according to requirements for using the apparatus.

Figure 6:
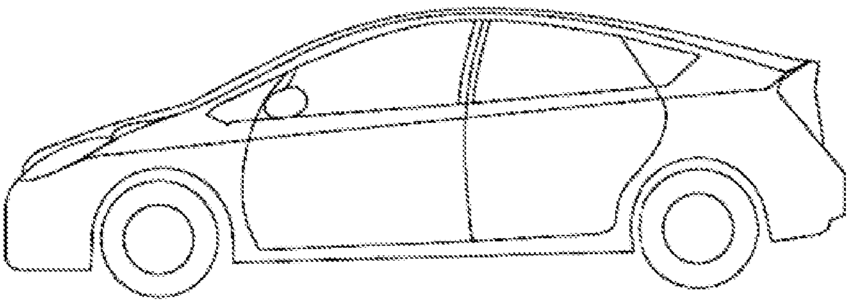
FIG. 6 is a schematic diagram of an apparatus using a lithium-ion secondary battery according to an embodiment of this application as a power source.

FIG. 6 shows an apparatus as an example. The apparatus is a battery electric vehicle, a hybrid electric vehicle, or a plug-in hybrid electric vehicle, or the like. To meet requirements of the apparatus for high power and high energy density of lithium-ion secondary batteries, a battery pack or a battery module may be used.

In another example, the apparatus may be a mobile phone, a tablet computer, a laptop computer, or the like. Such apparatus is generally required to be light and thin, and may use a lithium-ion secondary battery as a power source.

EXAMPLES

The following describes examples in this application. The examples described below are exemplary and only used to explain this application, but cannot be understood as a limitation on this application. Examples whose technical solutions or conditions are not specified are made based on technical solutions or conditions described in documents in the art, or made based on the product specification. The reagents or instruments used are all conventional products that can be purchased on the market if no manufacturer is indicated.

Example 1-1

1. Preparation of Lithium-Ion Secondary Battery (1) Preparation of Electrolyte

In a glove box filled with argon (water content<10 ppm, oxygen content<1 ppm), fluorobenzene, a compound represented by formula (1) and ethoxy(pentafluoro)cyclotriphosphazene, a compound represented by formula (2) were added to a mixture solvent of EC and DEC (with a mass ratio of EC to DEC=3:5), and 1 wt % ethylene carbonate and 1 wt % 1,3-propanesulfonate were also added to the mixture solvent. After the mixture was mixed uniformly, a lithium salt $LiPF_6$ and lithium bis(fluorosulfonyl)imide, a compound represented by formula (3), were slowly dissolved into the mixture so that a total concentration of the lithium salts in the obtained solution was 1 mol/L, a percentage by weight of fluorobenzene was 5%, a percentage by weight of the ethoxy(pentafluoro)cyclotriphosphazene was 5%, and a percentage by weight of the lithium bis(fluorosulfonyl)imide was 5% based on a total weight of the solution. In this way, an electrolyte was obtained.

(2) Preparation of Positive Electrode Plate

A positive electrode active substance $LiNi_{0.8}Co_{0.1}Mn_{0.1}O_2$, a conductive agent Super P, and a binder polyvinylidene fluoride (PVDF) were added to N-methylpyrrolidone (NMP) at a mass ratio of 8:1:1 to prepare a positive electrode slurry. A percentage by weight of solids in the positive electrode slurry was 50%. The positive electrode slurry was applied on a current collector aluminum foil (a mass of the positive electrode active material applied on the aluminum foil was 0.14 $mg/mm^2$), which was dried at 85° C. and cold pressed, followed by trimming, cutting, slitting, and drying under a vacuum condition at 85° C. for 4 h, to prepare a positive electrode plate.

(3) Preparation of Negative Electrode Plate

A negative electrode active material graphite (a mass percentage of graphite with OI≥8 in total graphite was 10%), a conductive agent Super P, a thickener CMC, and a binder butadiene styrene rubber (SBR) were mixed uniformly in deionized water at a mass ratio of 80:15:3:2 to prepare a negative electrode slurry. A percentage by weight of solids in the negative electrode slurry was 30%. The negative electrode slurry was applied on a current collector copper foil (a mass of the negative electrode active material applied on the copper foil was 0.08 $mg/mm^2$), which was dried at 85° C. and cold pressed, followed by trimming, cutting, slitting, and drying under a vacuum condition at 120° C. for 12 h, to prepare a negative electrode plate.

(4) Assembly of Lithium-Ion Secondary Battery

A polypropylene film (PE) with a thickness of 16 μm was used as a separator. The positive electrode plate, the separator, and the negative electrode plate prepared were stacked in order, so that the separator was sandwiched between the positive electrode plate and the negative electrode plate for separation, and winding was performed to obtain a bare cell. Tabs were welded and the bare cell was placed in an outer package. The prepared electrolyte was injected to the dried cell, followed by packaging, standing, formation, and shaping, to complete preparation of a lithium-ion secondary battery. The battery had a thickness of 4.0 mm, a width of 60 mm, and a length of 140 mm.

2. Test of Lithium-Ion Secondary Battery (1) High-Temperature Storage Performance Test of Lithium-Ion Battery At 25° C., a lithium-ion battery was charged to 4.2 V at a constant current of 1 C, then charged to 0.05 C at a constant voltage of 4.2 V, and then discharged to 2.8 V at 0.5 C to obtain a discharge capacity D0. The battery was stored in a 60° C. thermostat and taken out after 30 days. After being cooled down to a room temperature, the battery was discharged to 2.8 V at a constant current of 1 C, left standing for 5 minutes, charged to 4.2 V at a constant current of 1 C, then charged to a current of 0.05 C at a constant voltage of 4.2 V, and then discharged to 2.8 V at 0.5 C. At this moment, a discharge capacity was D1, and a reversible capacity retention rate of the battery after high-temperature storage was equal to D1/D0*100%.

(2) Thermal Runaway Performance Test of Lithium-Ion Battery

At an ambient temperature of 25° C., a lithium-ion battery was charged to 4.2 V at a constant current of 1 C, then charged to a current of 0.05 C at a constant voltage of 4.2 V. A temperature sensing cable was attached to a central position on a surface of the cell. The battery was then placed in a heating oven that was heated up at a temperature rise rate of 10° C./min, and the oven was maintained at a temperature for 30 min every 10° C. rise in temperature. In a case that a temperature sensed by the temperature sensing cable instantaneously and dramatically rose to a temperature far higher than that of the heating oven, it could be deemed that the cell experienced thermal runaway. The temperature of the heating oven when the battery experienced thermal runaway was recorded.

(3) Low-Temperature Discharge Power Test of Lithium-Ion Battery

At 25° C., a lithium-ion battery was charged to 4.2 V at a constant current of 1 C, then charged to a current of 0.05 C at a constant voltage of 4.2 V, and then discharged for 30 minutes at 1 C. The cell was placed at 0° C. for 2 h, and a voltage V1 was recorded at this time. Then the cell was discharged for 10 s at a constant current of 0.36 C, a voltage V2 was recorded at this time, and DCR=(V1−V2)/0.36 C. A lower DCR indicated higher discharge power at low temperature.

Example 1-2 to Example 1-7 and Comparative Examples 1 to 4

Tests were performed in a manner the same as those of Example 1-1, except that W1, W2, and W3 were changed, as shown in Table 1.

Comparative Examples 5 to 7

Tests were performed in a manner the same as those of Example 1-1, except that no fluorobenzene, ethoxy(pentafluoro)cyclotriphosphazene, or lithium bis(fluorosulfonyl) imide was used.

Percentages by weight of substances in electrolytes of Example 1-1 to Example 1-7 and Comparative Examples 1 to 7 and performance test results of batteries are shown in Table 1.

TABLE 1

| Example number | W1 % | W2 % | W3 % | W3/W2 | W1/W2 | Reversible capacity retention rate after high-temperature storage | Thermal runaway temperature (° C.) | DCR (mOhm) |
|---|---|---|---|---|---|---|---|---|
| 1-1 | 5% | 5% | 5% | 1 | 1 | 97.5% | 200 | 200 |
| 1-2 | 5% | 5% | 10% | 2 | 1 | 98.2% | 204 | 151 |
| 1-3 | 5% | 5% | 16% | 3.2 | 1 | 98.5% | 219 | 130 |
| 1-4 | 5% | 5% | 20% | 4 | 1 | 97.0% | 197 | 208 |
| 1-5 | 4% | 5% | 10% | 2 | 0.8 | 98.5% | 213 | 172 |
| 1-6 | 3% | 5% | 10% | 2 | 0.6 | 98.1% | 220 | 181 |
| 1-7 | 2.5% | 5% | 10% | 2 | 0.5 | 97.1% | 225 | 193 |
| Comparative Example 1 | 7% | 5% | 5% | 1 | 1.4 | 93.2% | 176 | 215 |
| Comparative Example 2 | 0.5% | 5% | 5% | 1 | 0.1 | 93.0% | 178 | 245 |
| Comparative Example 3 | 5% | 5% | 2.5% | 0.5 | 1 | 92.3% | 168 | 218 |
| Comparative Example 4 | 5% | 5% | 25% | 5 | 1 | 89.4% | 128 | 236 |
| Comparative Example 5 | / | 5% | 5% | / | / | 87.5% | 123 | 285 |
| Comparative Example 6 | 5% | / | 5% | / | / | 84.4% | 113 | 219 |
| Comparative Example 7 | 5% | 5% | / | / | / | 88.1% | 111 | 295 |

Note:
"/" means no substance is added.

Example 2-1 to Example 2-9

Tests were performed in a manner the same as those of Example 1-1, except that W1, W2, and W3 were changed.

Percentages by weight of substances in electrolytes of Example 2-1 to Example 2-9 and performance test results of batteries are shown in Table 2.

TABLE 2

| Example number | W1 % | W2 % | W3 % | W3/W2 | W1/W2 | Reversible capacity retention rate after high-temperature storage | Thermal runaway temperature (° C.) | DCR (mOhm) |
|---|---|---|---|---|---|---|---|---|
| 2-1 | 0.5% | 0.5% | 0.5% | 1 | 1 | 93.4% | 183 | 208 |
| 2-2 | 1% | 1% | 1% | 1 | 1 | 95.0% | 185 | 160 |
| 2-3 | 3% | 3% | 3% | 1 | 1 | 95.4% | 190 | 163 |
| 2-4 | 8% | 8% | 8% | 1 | 1 | 99.6% | 240 | 136 |
| 2-5 | 10% | 10% | 10% | 1 | 1 | 99.4% | 230 | 146 |
| 2-6 | 15% | 15% | 15% | 1 | 1 | 97.3% | 197 | 152 |
| 2-7 | 16% | 16% | 16% | 1 | 1 | 94.3% | 183 | 156 |
| 2-8 | 20% | 20% | 20% | 1 | 1 | 94.0% | 186 | 158 |
| 2-9 | 22% | 22% | 22% | 1 | 1 | 93.6% | 182 | 207 |

Example 3-1 to Example 3-6

Tests were performed in a manner the same as those of Example 1-1, except that types of positive electrode active substances were changed and W1, W2, and W3 were changed.

Percentages by weight of substances in positive electrode active substances and electrolytes of Example 3-1 to Example 3-6 and performance test results of batteries are shown in Table 3.

TABLE 3

| Example number | Positive electrode active substance | W1 % | W2 % | W3 % | W3/W2 | W1/W2 | Reversible capacity retention rate after high-temperature storage | Thermal runaway temperature (° C.) | DCR (mOhm) |
|---|---|---|---|---|---|---|---|---|---|
| 3-1 | $LiNi_{0.5}Co_{0.2}Mn_{0.3}O_2$ | 5% | 5% | 16% | 3.2 | 1 | 99.0% | 210 | 120 |
| 3-2 | $LiNi_{0.5}Co_{0.2}Mn_{0.3}O_2$ | 5% | 5% | 6.25% | 1.25 | 1 | 98.8% | 220 | 100 |
| 3-3 | $LiNi_{0.5}Co_{0.2}Mn_{0.3}O_2$ | 5% | 8% | 16% | 2 | 0.63 | 98.6% | 215 | 127 |
| 3-4 | $LiNi_{0.4}Co_{0.2}Mn_{0.4}O_2$ | 4% | 4% | 16% | 4 | 1 | 99.3% | 250 | 115 |
| 3-5 | $LiNi_{0.4}Co_{0.2}Mn_{0.4}O_2$ | 4% | 4% | 4% | 1 | 1 | 99.0% | 265 | 128 |
| 3-6 | $LiNi_{0.4}Co_{0.2}Mn_{0.4}O_2$ | 4% | 5% | 16% | 3.2 | 0.8 | 99.5% | 248 | 123 |

Example 4-1 to Example 4-4

Tests were performed in a manner the same as those of Example 1-1, except that trifluoromethylbenzene was used as the compound represented by formula (1), methoxy pentafluorocyclotriphosphazene was used as the compound represented by formula (2), lithium (fluorosulfonyl)(trifluoromethanesulfonyl)imide was used as the compound represented by formula (3), and values of W1, W2 and W3 shown in Table 4 were used.

Percentages by weight of substances in electrolytes of Example 4-1 to Example 4-4 and performance test results of batteries are shown in Table 4.

TABLE 4

| Example number | W1 % | W2 % | W3 % | W3/W2 | W1/W2 | Reversible capacity retention rate after high-temperature storage | Thermal runaway temperature (° C.) | DCR (mOhm) |
|---|---|---|---|---|---|---|---|---|
| 4-1 | 5% | 5% | 5% | 1 | 1 | 97.0% | 189 | 203 |
| 4-2 | 5% | 5% | 10% | 2 | 1 | 97.5% | 197 | 149 |
| 4-3 | 5% | 5% | 16% | 3.2 | 1 | 98.0% | 212 | 140 |
| 4-4 | 5% | 5% | 20% | 4 | 1 | 96.4% | 184 | 211 |

It can be seen from results in Tables 1 to 4 that compared with all comparative examples, low-temperature discharge power performance, high-temperature storage performance, and thermal runaway performance in all examples were balanced and improved. This indicates that a specified ratio and use of the compounds represented by formula (1) to formula (3) in this application can improve overall performance of a cell containing a high-nickel positive electrode active substance.

It can be seen from Comparative Example 1 and Comparative Example 2 that values of W1/W2 being out of a range of 0.5-1 had two cases: (1) When the values of W1/W2 were less than 0.5, conductivity of electrolytes was low, but DCRs were high, which severely reduced low-temperature power performance of cells. In addition, it was speculated that due to the low conductivity, anodes were prone to lithium precipitation when the batteries were fully charged, thereby shortening storage life of the cells to some degrees. (2) When values of W1/W2 were greater than 1, phosphonitrile contents in the electrolytes were too small to effectively improve safety performance of cells. It can be seen from Comparative Example 3 and Comparative Example 4 that when values of W3/W2 were less than 1, conductivity of electrolytes was low, but DCRs were high, and service life, rates, power, and other performance of cells were poor. When the values of W3/W2 were greater than 4, safety performance of the cells deteriorated.

The compound represented by formula (1) was not used in Comparative Example 5, and therefore low-temperature discharge power performance was poor. The compound represented by formula (2) was not included in Comparative Example 6, and therefore a thermal runaway temperature of a cell was low. The compound represented by formula (3) was not included in Comparative Example 7, and therefore a thermal runaway temperature of a cell was low, conductivity of an electrolyte was low, and low-temperature discharge power performance of the cell was poor.

It can be seen from Table 2 that when W1% was in a range of 1-15%, a low-temperature DCR decreased gradually with an increase in W1%, and a further decrease in W1% barely contributed to power improvement. When W2% was in a range of 1-20%, and W3% was in a range of 5-20%, a thermal runaway temperature of a cell rose gradually. In other words, safety performance of the cell improved gradually.

It can be seen from Examples 3-1, 3-2, 3-4, and 3-5 in Table 3 that when $W3=25x^2$ and/or $W2=10x$ are satisfied, thermal stability and flame retardancy of electrolytes could be improved, thereby significantly improving safety performance of cells.

It can be seen from Table 4 that when $1 \leq W3/W2 \leq 4$ and $0.5 \leq W1/W2 \leq 1$ are satisfied, use of other compounds represented by formula (1) to formula (3) could also improve low-temperature discharge power performance, high-temperature storage performance, and thermal runaway performance of batteries containing high-nickel positive electrode active substances.

Although this application has been described with reference to the embodiments, various modifications can be made to this application without departing from the scope of this application and the components therein can be replaced with their equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A lithium-ion secondary battery, comprising a positive electrode plate, a negative electrode plate, a separator, and an electrolyte, wherein the positive electrode plate comprises a positive electrode current collector and a positive electrode material layer disposed on at least one surface of the positive electrode current collector, and the positive electrode material layer contains a positive electrode active substance, wherein the positive electrode active substance includes $LiNi_xCo_yN_zM_{1-x-y-z}O_2$, with N selected from Mn and Al, and M selected from any one of Co, Ni, Mn, Mg, Cu, Zn, Al, Sn, B, Ga, Cr, Sr, V, and Ti, where $0.5 \leq x < 1$, $0 \leq y \leq 1$, $0 \leq z \leq 1$, and $x+y+z \leq 1$; and the electrolyte includes compounds represented by formula (1), formula (2), and formula (3):

(1)

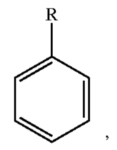

, where R is selected from a fluorine atom and a fluorinated C1-C6 alkyl group, (2)

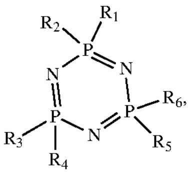

where $R_1$ to $R_6$ are each independently selected from a C1-C6 halogenated alkyl group, halogen, a C1-C6 alkyl group, a C1-C6 alkoxy group, and a C1-C6 alkyl group containing N or P, where the halogen is fluorine, chlorine, bromine, or iodine, and a ratio of the number of halogen atoms to the number of P atoms in the compound represented by formula (2) is 1:3 to 2:1, (3)

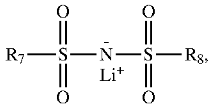

where $R_7$ and $R_8$ are each independently selected from a C1-C3 alkyl group substituted by a fluorine atom, a hydrogen atom, a fluorine atom, and a helium atom, and based on a total weight of the electrolyte, a percentage by weight of the compound represented by formula (1) is W1%, wherein W1% is in a range of 1%-15%; a percentage by weight of the compound represented by formula (2) is W2%, wherein W2% is in a range of 1%-20%;

and a percentage by weight of the compound represented by formula (3) is W3%, wherein W3% is in a range of 5%-20%; wherein W1, W2, and W3 satisfy $1 \leq W3/W2 \leq 4$ and $0.5 \leq W1/W2 \leq 1$;

wherein the negative electrode plate comprises a negative electrode current collector and a negative electrode material layer disposed on at least one surface of the negative electrode current collector, the negative electrode material layer contains a negative electrode active substance, and the negative electrode active substance contains graphite with $OI \geq 8$ whose percentage by weight is $\leq 20\%$ based on a total weight of the negative electrode active substance, wherein the compound represented by formula (1) consists of fluorobenzene, the compound represented by formula (2) consists of ethoxy(pentafluoro)cyclotriphosphazene, and the compound represented by formula (3) consists of lithium bis(fluorosulfonyl)imide.

2. The lithium-ion secondary battery according to claim 1, wherein the lithium-ion secondary battery satisfies at least one of the following conditions (a) and (b):

$$W3 = 25x^2; \text{ and} \quad (a)$$

$$W2 = 10x. \quad (b)$$

3. The lithium-ion secondary battery according to claim 1, wherein $0.65 \leq x \leq 0.9$.

4. The lithium-ion secondary battery according to claim 1, wherein a total concentration of lithium salts in the electrolyte is 0.8M-1.5M.

5. A battery module, comprising the lithium-ion secondary battery according to claim 1.

6. A battery pack, comprising the battery module according to claim 5.

* * * * *